United States Patent [19]

Hasegawa et al.

[11] Patent Number: 4,472,742

[45] Date of Patent: Sep. 18, 1984

[54] VIDEO AND SOUND RECORDING DEVICE WITH AUTOMATIC FOCUSING SYSTEM

[75] Inventors: Wataru Hasegawa, Osaka; Hiroshi Makino, Hirakata; Katsuji Ishikawa, Osaka, all of Japan

[73] Assignee: West Electric Co., Ltd., Osaka, Japan

[21] Appl. No.: 377,563

[22] Filed: May 12, 1982

[30] Foreign Application Priority Data

May 12, 1981 [JP] Japan .................................. 56-71074

[51] Int. Cl.³ .............................................. H04N 5/26
[52] U.S. Cl. .................................... 358/227; 358/906;
352/140
[58] Field of Search ........................ 358/906, 227, 347;
354/195; 352/140, 139; 360/33.1

Primary Examiner—John C. Martin
Assistant Examiner—Luan Nguyen
Attorney, Agent, or Firm—Burgess, Ryan & Wayne

[57] ABSTRACT

There are video and sound recording devices such as movie cameras or video cameras with an automatic focusing system of the type for setting a photographic lens to a position at which an object can be sharply focused in response to the signal which is representative of a distance from the camera to the object and obtained by measuring the time interval from the time when the ultrasonic waves are transmitted at a predetermined repetition frequency to the object to the time when the echo from the object is received. Such devices have a common defect that a microphone picks up impulse-like noise generated from an ultrasonic transducer especially at the start point of ultrasonic waves. To overcome this problem, the present invention provides an audible noise elimination or suppression means or a control circuit which operates in synchronism with the ultrasonic wave transmission so that an audio signal processing system attenuates the audio output signal.

6 Claims, 6 Drawing Figures

VIDEO AND SOUND RECORDING DEVICE WITH AUTOMATIC FOCUSING SYSTEM

BACKGROUND OF THE INVENTION

The present invention relates to a video and sound recording device with an automatic focusing system.

Ultrasonic wave type automatic focusing devices use sound waves having frequencies above the audible range so that one cannot perceive or hear them, but when they are generated at a predetermined frequency for some time interval, they generate sound waves audible to human ears.

Various cameras with an ultrasonic wave type automatic focusing system have long been put on the market and in the cases of still-cameras the impulse-like audible noise (to be referred to as "ultrasonic frequency noise" in this specification) generated by an ultrasonic transducer especially at the start points of ultrasonic waves present no problem at all in practice. However, in the cases of movie or video cameras which record and reproduce the video and audio signals simultaneously, the ultrasonic frequency noise, which is audible, is picked up by a microphone and recorded. As a result, "chirping" noise is reproduced at a predetermined frequency, thus adversely affecting the reproduced audio signal.

If a noise source; that is, an ultrasonic transducer and a microphone are spaced apart from each other by a sufficient distance, no noise is picked up by the latter or noise can be almost suppressed. However, in practice, they must be spaced apart from each other by at least 20 to 30 cm so that the noise generated by the ultrasonic transducer is inevitably picked up by the microphone.

One of the remedies to this problem is the elimination of noise generated from the ultrasonic transducer, but the present ultrasonic transducers cannot transmit ultrasonic sounds without generating the impulse-like audible noise. Lowering the transmission level will result in lowering the noise level, but the effective measuring range will be shortened accordingly. That is, the camera's performance will be degraded.

OBJECTS OF THE INVENTION

Accordingly, one of the objects of the present invention is to provide a video and sound recording device with an ultrasonic wave type automatic focusing system in which adverse effects of noise due to ultrasonic sound wave transmission can be suppressed to a minimum or almost eliminated by the electrical or electronic processing of audio signal in an audio signal processing system.

Another object of the present invention is to provide a video and sound recording device which is provided with an audio signal processing system which operates in synchronism with the ultrasonic wave transmission so as to attenuate the level of audio output signal.

The above and other objects, features and effects of the present invention will become more apparent from the following description of some preferred embodiments thereof taken in conjunction with the accompanying drawings.

BRIEF DESCRIPTION OF THE DRAWINGS

Same reference numerals are used to designate similar parts throughout the figures.

DESCRIPTION OF THE PREFERRED EMBODIMENTS

Figure 1:
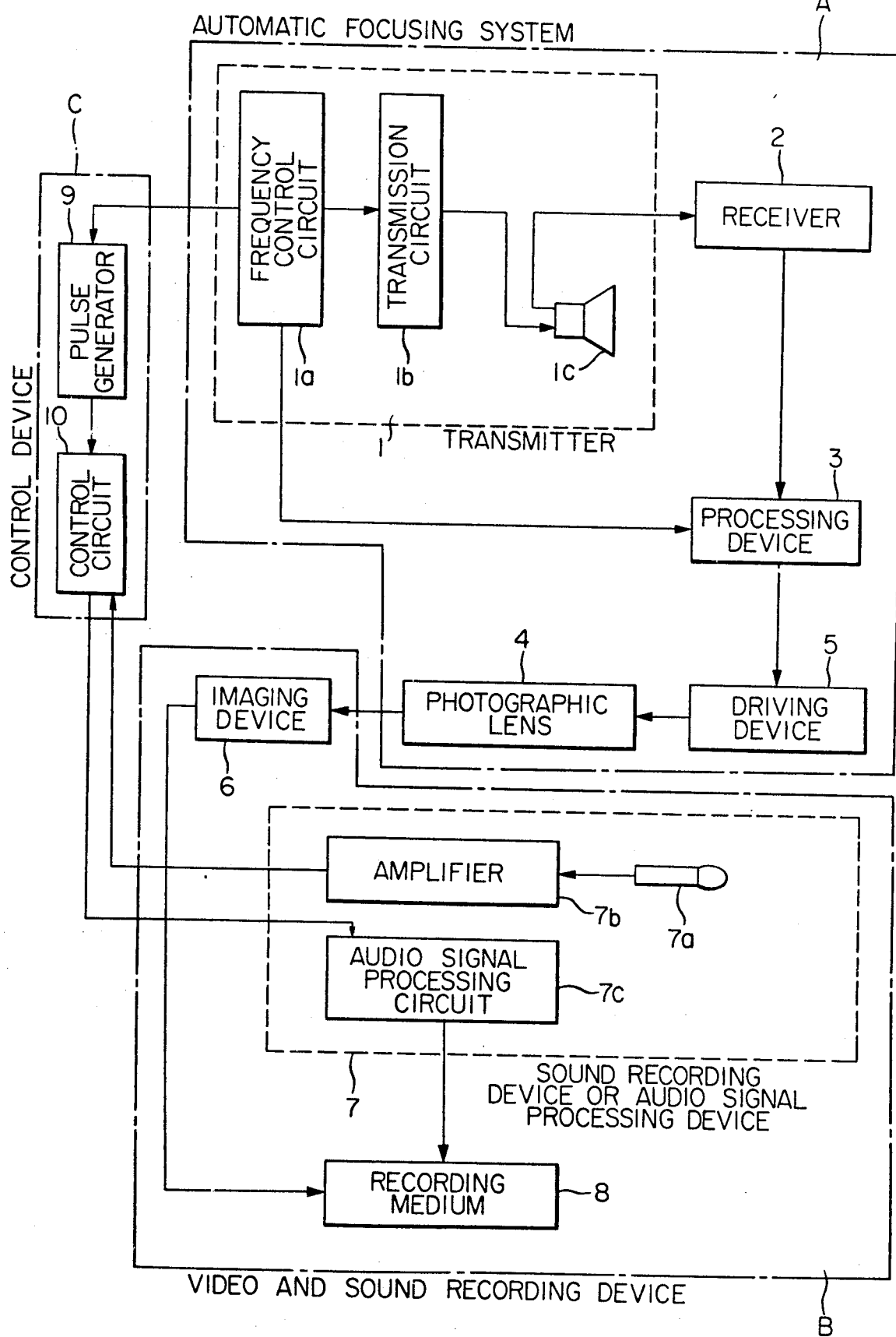
FIG. 1 is a block diagram of a first embodiment of a video and sound recording device with an ultrasonic wave type automatic focusing system in accordance with the present invention.

In FIG. 1 is shown in block diagram form the fundamental construction of a first embodiment of the video and sound recording device with an ultrasonic wave type automatic focusing system (to be referred to as "an automatic focusing system" in this specification) in accordance with the present invention. The device comprises, in general, an automatic focusing system generally indicated by the reference character A, a video and sound recording device or system B and a control system or device C.

The automatic focusing system A comprises a transmitter 1 which in turn comprises a frequency control circuit 1a for controlling the frequency of the ultrasonic signal to be transmitted, a transmission circuit 1b which supplies the energy for transmission and a transducer 1c which is adapted to send the ultrasonic wave energies and receive their echos; a receiver 2 which is adapted to amplify and detect the output received from the transducer 1c; a processing device 3 which measures the distance to an object in terms of the time interval from the transmission of ultrasonic waves to the reception of the echo; and a driving device 5 which is responsive to the output from the processing device 3 for driving a photographic lens 4 to a focusing position.

The video and sound recording device B comprises an imaging device or video signal processing device 6 which is adapted to process the light input signal obtained through the lens 4 for recording, a sound recording device or audio signal processing device 7 comprising a microphone 7a, an amplifier 7b and an audio signal processing circuit 7c and a recording medium 8 upon which are recorded the information from the imaging device 6 and the sound recording device 7.

The control system C comprises a pulse generator 9 which generates a train of pulses in synchronism with the frequency control circuit 1a and a control circuit 10 which is responsive to the output from the pulse generator 9 for controlling the sound recording device 7.

The mode of operation of the video and sound recording device with the above-described construction is as follows. First in response to the output from the frequency control circuit 1a, the transmission circuit 1b is activated and the transducer 1c sends and receives the ultrasonic waves. The time interval from the transmission of ultrasonic waves to the arrival of the echo is measured to detect the distance from the camera to an object or subject. Next, the processing device 3 processes the distance-to-object information thus obtained to control the driving device 5 which in turn controls the shift of the lens 4 to focus the object sharply or correctly.

The video and sound recording device B records the light input received from the object through the lens 4, which has been set to focus the object in the manner described above, upon the recording medium 8 through the imaging device 6. The audio signal processing device 7 records the audio signal picked up by the microphone 7a on the same recording medium 8 through the amplifier 7b and the audio signal processing circuit 7c.

In the control device C, the pulse generator 9 generates a train of pulses in response to the output from the frequency circuit 1a described hereinbefore to drive the control circuit 10 which in turn controls the sound recording device 7. Briefly stated, the control device C controls the sound recording or audio signal processing device 7 in response to the transmission of ultrasonic waves by the transmitter 1.

In general, high level ultrasonic frequency noise is generated especially at the initiation of transmission and the residual noise persists even after the termination of ultrasonic wave transmission. Assume that the distance between the transducer 1c and the microphone 7a be L and that the sound speed be 340 m/sec. Then the first noise arrives at the microphone 7a ($T=1/340 \times L$) seconds after the transmission.

Therefore, it follows that if part of the output from the audio signal processing device 7 is attenuated after the time t, the ultrasonic frequency noise is also attenuated. As a result, even if the ultrasonic frequency noise is reproduced, it becomes not audible to human ears. In other words, if the output from the audio signal processing device 7 is attenuated for a time interval of $\alpha$ seconds after the time t after the transmission, the ultrasonic frequency noise, which is at a high level especially when the transmission is started as described before, can be removed. However, there arises a problem that the required audio signal is also attenuated for the time interval $\alpha$ so that it cannot be detected. The results of the experiments conducted by the same inventors show that if a voice message is attenuated for the time interval of more than ten msec, some sound elements which otherwise make the speed intelligible are lost, but if the attenuation time interval is less than 10 msec, an interruption of the voice message cannot be perceived and consequently presents no problem in practice. That is, it becomes possible to suppress the ultrasonic frequency noise. In general, the ultrasonic wave transmission time interval is of the order of one msec so that the attenuation time interval $\alpha$ must be at least 1 msec and longer when the adverse effects of residual noise are taken into consideration. Therefore, in either case, the attenuation time interval can be selected shorter than 10 msec described above.

If the audio output is completely attenuated, variations in noise level may be perceived so that the degree of attenuation must be determined depending upon the levels of audio signal and ultrasonic frequency noise.

Figure 2:
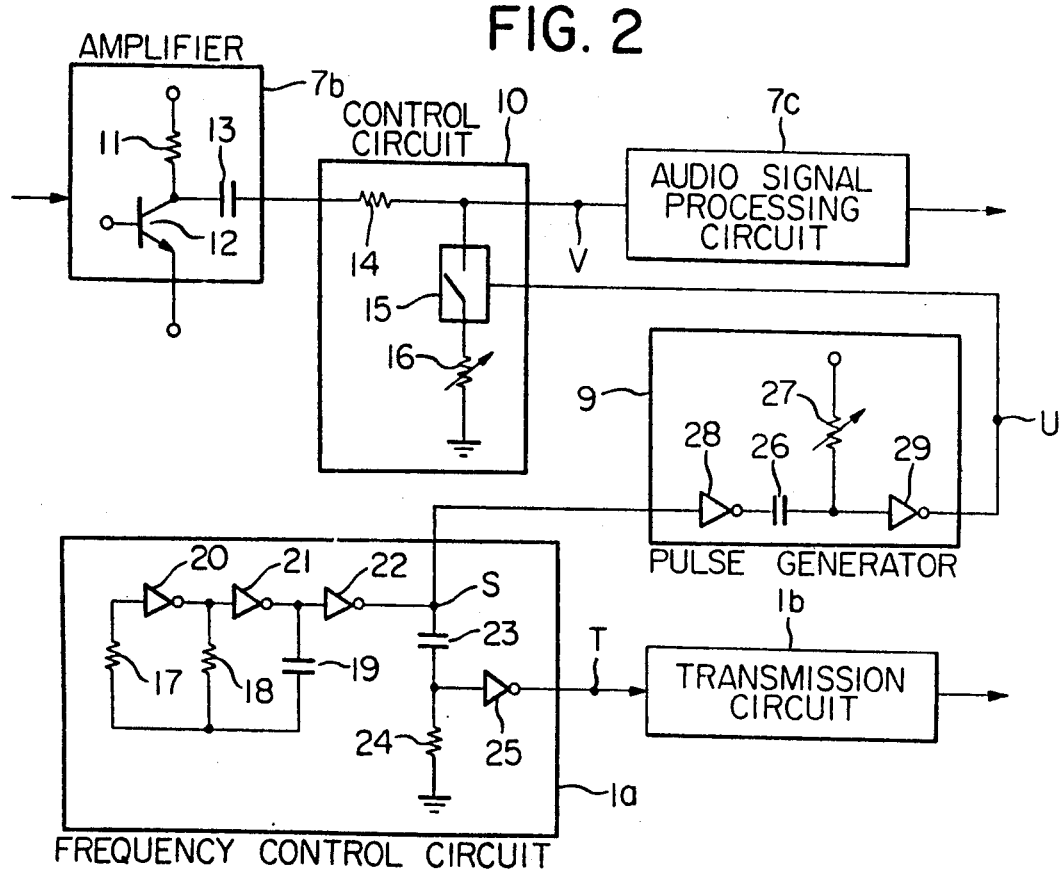
FIG. 2 shows major components thereof.

In FIG. 2 are shown the essential or major components of the automatic focusing video and sound recording device in accordance with the present invention; that is, the control device which is a control means for eliminating the ultrasonic frequency noise in the sound recording or audio signal processing device, part of this device which is controlled by the control device and the frequency circuit including its peripheral circuits for controlling the control device. In the control device C, the control circuit 10 succeeds the output stage of the amplifier 7b of the sound recording device 7.

Still referring to FIG. 2, the amplifier 7b comprises a resistor 11, a transistor 12 and a coupling capacitor 13. The control circuit 10 comprises a resistor 14 which determines the degree of attenuation, a variable resistor 16 and an analog switch 15 which is actuated to close itself in response to a high-level input during the attenuation time interval. The frequency control circuit 1a comprises inverters 20, 21 and 22, resistors 17 and 18 and a capacitor 19 which determine a transmission interval and a differentiating circuit consisting of a capacitor 23, a resistor 24 and an inverter 25. The pulse generator 9 comprises a differentiating circuit which in turn comprises inverters 28 and 29, a capacitor 26 and a variable resistor 27.

Figure 3:
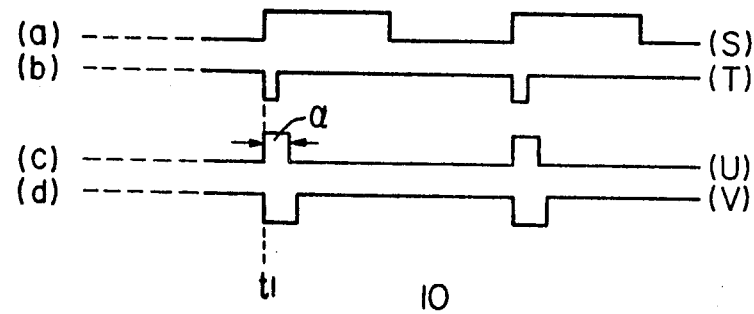
FIG. 3 shows waveforms of voltage signals at various points in the circuits shown in FIG. 2.

In FIG. 3, (a), (b), (c) and (d) show, respectively, the voltage waveforms at the points S, T, U and V in the circuit shown in FIG. 2 and are used for explanation of the operations of the circuits shown therein.

In FIG. 3 (a) shows the waveform of the output which is delivered from the frequency control circuit 1a and appears at the point S. This pulse determines a transmission interval. At the time $t_1$ when the pulse as shown at (3) in FIG. 3 rises, the pulse signal as shown at (b) in FIG. 3 appears at the point T, this signal being the output from the differentiating circuit comprising the capacitor 23, the resistor 24 and the inverter 25. The pulse signal is delivered to the transmission circuit 1b to determine the transmission time interval.

The pulse signal S (See (a) in FIG. 3) is also delivered to the pulse generator 9 which in turn generates the pulse signal U as shown at (c) in FIG. 3. The pulse signal U is delivered to the analog switch 15 in the control circuit 10 and the switch 15 is kept turned on as long as the pulse signal U is impressed. When the analog switch 15 is turned on, the point V in FIG. 2 is grounded through the variable resistor 16 so that the potential at the point U varies as shown at (d) in FIG. 3. In other words, the signal which appears at the point V is attenuated. The attenuation time interval is of course determined by the pulse signal as shown at (c) in FIG. 3; that is, by the pulse generator 9. The degree of attenuaton is determined by the variable resistor 16.

As described above, the circuits as shown in FIG. 2 attenuate the signal which appears at the point V; that is, the output from the amplifier 7b in the audio signal processing device 7 in response to the transmission of ultrasonic waves so that no ultrasonic frequency noise is transmitted to the processing circuit 7c when the transmission is started. As a result, it is not recorded on the recording medium 8 so that no noise is generated during reproduction.

Figure 4:
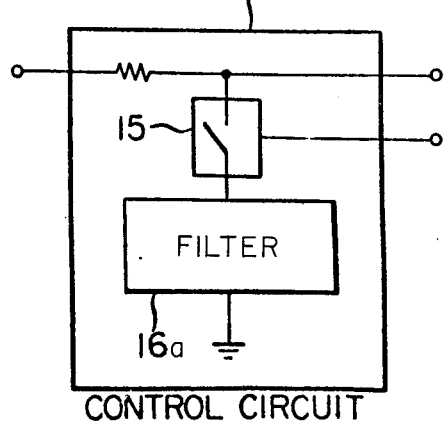
FIG. 4 shows a modification of a control circuit shown in FIG. 2.

In FIG. 4 is shown a modification of the control circuit 10 which employs a filter 16a with a predetermined frequency characteristic instead of the variable resistor 16 as shown in FIG. 2. In the case of the first embodiment as illustrated in FIG. 2, every frequency component in the whole range is attenuated. However, the level of ultrasonic frequency noise varies depending upon the transmission energy, frequency and time interval. It follows, therefore, that if the filter 16a which matches the characteristics of ultrasonic frequency noise, an optimum suppression or elimination thereof becomes possible.

Figure 5:
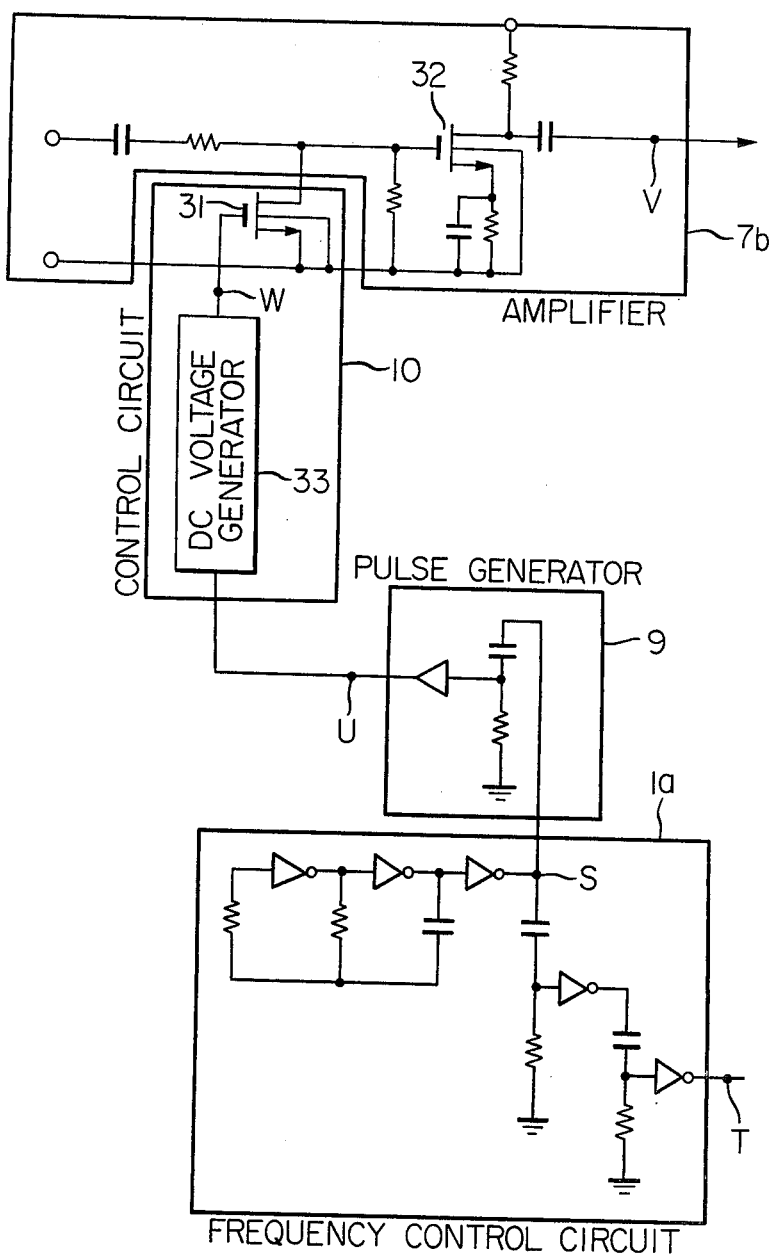
FIG. 5 is a circuit diagram of a second embodiment of the present invention.
Figure 6:
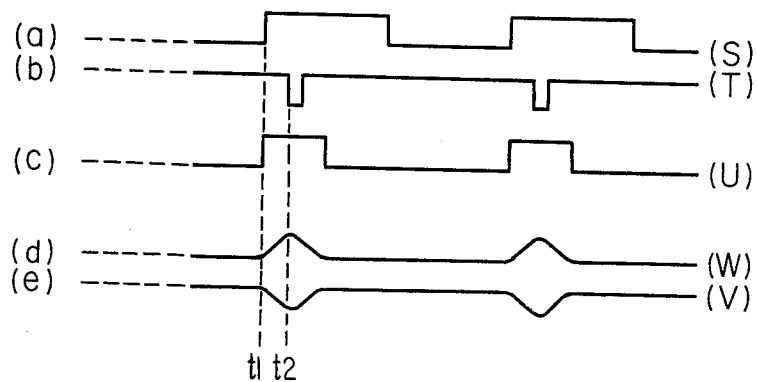
FIG. 6 shows waveforms of voltage signals at various points in the circuits shown in FIG. 5.

In FIG. 5 is shown a second embodiment of the automatic focusing video and sound recording device in accordance with the present invention. FIG. 6 shows the waveforms of the voltages which appear at the points S, T, U, W and V, respectively, in FIG. 5. In the design of the second embodiment, the human hearing characteristics are taken into consideration. That is, the human auditory system is more sensitive to rapid variations in sound properties than to gradual variations. Therefore, the second embodiment is so arranged that the audio output is gradually attenuated even before the transmission of ultrasonic waves and further attenuated to the maximum while the ultrasonic frequency noise appears and then the attenuaton is gradually released after the noise has disappeared.

Still referring to FIG. 5, the mode of operation of the second embodiment will be described in more detail. The frequency control circuit 1a delivers to the point S the pulse output as shown at (a) in FIG. 6 so that the pulse signal as shown at (b) in FIG. 6 appears at the point T and controls the transmission circuit 1b. In response to the pulse signal S, the pulse generator 9 delivers to the point U the pulse signal as shown at (c) in FIG. 6. This pulse signal U is applied to a DC voltage generator 33 in the control circuit 10. In response to the pulse signal U, the voltage generator 33 delivers the output as shown at (d) in FIG. 6 to the point W, thereby controlling a FET 31.

In response to the signal W (at (d) in FIG. 6) the amplifier 7b which includes FET 32 delivers the signal as shown at (e) in FIG. 6 to the point V. It is seen that the audio signal at the point V is being gradually compressed.

As described above, according to the second embodiment, the attenuation of the audio output signal from the amplifier 7b is started from the time $t_1$ prior to the time $t_2$ which the ultrasonic wave transmission is started and the attenuation is gradually increased to and maintained at the maximum level during the ultrasonic wave transmission. Thus, the gradual attenuation characteristic can be attained. As described before, the human hearing characteristics are taken into consideration in the second embodiment so that the satisfactory elimination or suppression of ultrafrequency noise can be attained.

In summary, in the video and sound recording device with an automatic focusing system for automatically focusing an object or subject sharply or correctly by transmitting the ultrasonic frequency wave and receiving the echo reflected from the object or subject, the present invention provides the control circuit which operates in synchronism with the transmission of ultrasonic waves so that the ultrasonic frequency noise, which is generated in the transmission of the ultrasonic waves for detecting the distance to the object or subject, can be prevented from being recorded on the recording medium through the microphone. Thus, the present invention provides a means which is highly effective in eliminating the ultrasonic frequency noise in practice.

What is claimed is:

1. A video and sound recording device with an ultrasonic wave type automatic focusing system of the type comprising
   (A) an ultrasonic wave type automatic focusing system comprising
      a transmission means for sending ultrasonic waves at a predetermined time interval to an object,
      a receiver for receiving the echo reflected from said object,
      a processing means for measuring the time interval from the transmission of ultrasonic waves to the reception of said echo, and
      a driving means which is responsive to the output from said processing means for driving an imaging lens to a position at which said object is sharply focused;
   (B) an audio signal processing system for processing an audio signal and including a microphone;
   (C) a video signal processing system for processing the light input obtained through said imaging lens; and
   (D) a recording medium upon which are recorded the outputs from said audio signal processing system and said video signal processing system;
   (I) a pulse generating circuit which is synchronized with said transmission means for generating a train of pulses at predetermined pulse repetition rate, and
   (II) a control circuit which is responsive to the output pulse from said pulse generating circuit for attenuating the audio signal in said audio signal process system when said transmission means sends the ultrasonic waves.

2. A video and sound recording device with an ultrasonic wave type automatic focusing system as set forth in claim 1 further characterized in that said control circuit is adapted to attenuate the amplitude of the audio signal in the whole frequency range thereof.

3. A video and sound recording device with an ultrasonic wave type automatic focusing system as set forth in claim 1 further characterized in that said control circuit includes a filter means with predetermined frequency characteristics, whereby the amplitude of the audio signal in a predetermined frequency range can be attenuated.

4. A video and sound recording device with an ultrasonic wave type automatic focusing system as set forth in claim 1, 2 or 3 further characterized in that said control circuit includes an analog switch which is controlled in response to the output pulse from said pulse generating circuit to lower the level of the audio signal.

5. A video and sound recording device with an ultrasonic wave type automatic focusing system as set forth in claim 1 further characterized in that said pulse generating circuit is adapted to deliver a train of pulses with a pulse duration of less than about 10 msec.

6. A video and sound recording device with an ultrasonic wave type automatic focusing system as set forth in claim 1 further characterized in that said control circuit comprises
   a DC voltage generating means which is controlled in response to the pulse output from said pulse generating circuit, and
   a variable impedance element which is controlled in response to the voltage output from said DC voltage generating means for attenuating the audio signal.

* * * * *